United States Patent
Tsun

(10) Patent No.: US 7,644,315 B2
(45) Date of Patent: Jan. 5, 2010

(54) DIAGNOSTICS AND ERROR REPORTING FOR COMMON TAGGING ISSUES

(75) Inventor: Stephen Tsun, Cupertino, CA (US)

(73) Assignee: Google Inc., Mountain View, CA (US)

( * ) Notice: Subject to any disclaimer, the term of this patent is extended or adjusted under 35 U.S.C. 154(b) by 322 days.

(21) Appl. No.: 11/554,397

(22) Filed: Oct. 30, 2006

(65) Prior Publication Data
US 2008/0155340 A1 Jun. 26, 2008

(51) Int. Cl.
*G06F 11/00* (2006.01)
(52) U.S. Cl. .......................................... 714/38
(58) Field of Classification Search .................... 714/38
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,948,061 A | 9/1999 | Merriman | |
| 6,026,368 A | 2/2000 | Brown et al. | |
| 6,044,376 A | 3/2000 | Kurtzman, II | |
| 6,078,914 A | 6/2000 | Redfern | |
| 6,144,944 A | 11/2000 | Kurtzman, II et al. | |
| 6,167,382 A | 12/2000 | Sparks et al. | |
| 6,269,361 B1 | 7/2001 | Davis et al. | |
| 6,353,923 B1 | 3/2002 | Bogle et al. | |
| 6,401,075 B1 | 6/2002 | Mason et al. | |
| 6,463,578 B1 | 10/2002 | Johnson | |
| 6,615,091 B1 * | 9/2003 | Birchenough et al. | 700/96 |
| 6,668,369 B1 | 12/2003 | Krebs et al. | |
| 6,874,021 B1 * | 3/2005 | Liu et al. | 709/223 |
| 6,985,882 B1 | 1/2006 | Del Sesto | |
| 7,136,875 B2 | 1/2006 | Anderson et al. | |
| 7,039,599 B2 | 5/2006 | Merriman | |
| 2002/0046016 A1 * | 4/2002 | Debling | 703/28 |
| 2002/0097268 A1 * | 7/2002 | Dunn et al. | 345/760 |
| 2004/0216042 A1 * | 10/2004 | Consolatti et al. | 715/513 |
| 2005/0177401 A1 * | 8/2005 | Koeppel et al. | 705/4 |
| 2007/0150556 A1 * | 6/2007 | Fukuda et al. | 709/219 |

FOREIGN PATENT DOCUMENTS

| | | |
|---|---|---|
| EP | 1 420 562 | 5/2004 |
| JP | 2004-185063 | 7/2004 |
| WO | WO 97/21183 | 6/1997 |

OTHER PUBLICATIONS

U.S. Appl. No. 95/001,073, Reexamination of Stone et al., Sep. 30, 2004.

(Continued)

*Primary Examiner*—Scott T Baderman
*Assistant Examiner*—Yair Leibovich
(74) *Attorney, Agent, or Firm*—Fish & Richardson P.C.

(57) ABSTRACT

Content requests are debugged in accordance with a presence of a flag in a request to a publisher. A document received from the publisher contains a script to debug requests for content to a content provider. The requests are examined to determine the presence of informational, warning and error conditions. The conditions are written to a debugging user interface.

23 Claims, 5 Drawing Sheets

OTHER PUBLICATIONS

U.S. Appl. No. 95/001,061, Reexamination of Stone et al., Sep. 3, 2002.
U.S. Appl. No. 95/001,069, Reexamination of Dean et al., Jul. 11, 2002.
U.S. Appl. No. 95/001,068, Reexamination of Stone et al., Dec. 7, 2002.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy And Sell Web Advertising Space," © 1997.
Information Access Technologies, Inc., Aaddzz.com website archive from www. Archive.org, archived on Jan. 30, 1998.
Zeff, R. et al., Advertising on the Internet, 2nd Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Patent No. 7,240,025 B2, Control No. 95/001,073.
Request for Reexamination of U.S. Patent No. 6,446,045 B1, Control No. 95/001,061.
Request for Reexamination of U.S. Patent No. 7,249,059 B2, Control No. 95/001,069.
Request for Reexamination of U.S. Patent No. 6,829,587 B2, Control No. 95/001,068.

* cited by examiner

Google Debug Window ( Submit Data )

| Offset (msec) | Level | Message |
|---|---|---|
| 0 | Information | google_ads.js is being loaded at Monday, July 31, 2006 1:56:12 PM |
| 0 | Information | publisher URL=http://www.corp.google.com/~stsun/ads2/badfill.html?google_debug |
| 0 | Information | user agent=Mozilla/5.0 (Windows; U; Windows NT 5.1; en-US; rv:1.8.0.5) Gecko/20060719 Firefox/1.5.0.5 |
| 0 | Information | google_ads.js finished loading |
| 0 | Information | Slot: publisher id=ca-pub1, name=TOPSLOT has been added |
| 0 | Information | [AdData:[GA_GoogleAdSlot: pubid=ca-pub1, name=TOPSLOT, loaded=0, tries=0]] |
| 0 | Information | Issuing fetch ad attr call with ./slotdata.js?client=ca-pub1 |
| 63 | Information | Attributes received for slots [TOPSLOT: width=336, height=280, expandable=false, enabled=true] |
| 63 | Information | Using Multiple Call, Asynchronous Implementation |
| 63 | Information | [AdData:[GA_GoogleAdSlot: pubid=ca-pub1, name=TOPSLOT, loaded=0, tries=0]] |
| 126 | Information | FetchAd Generated a correlator=1154379372491 |
| 141 | Error | Skipping undefined Ad Slot ("TOP2SLOT") |

FIG. 4

Google Debug Window ( Submit Data )

| Offset (msec) | Level | Message |
|---|---|---|
| 0 | Information | google_ads.js is being loaded at Monday, July 31, 2006 1:57:16 PM |
| 0 | Information | publisher URL=http://www.corp.google.com/~stsun/ads2/noslot.html?google_debug |
| 0 | Information | user agent=Mozilla/5.0 (Windows; U; Windows NT 5.1; en-US; rv:1.8.0.5) Gecko/20060719 Firefox/1.5.0.5 |
| 0 | Information | Google_ads.js finished loading |
| 0 | Information | [AdData:] |
| 0 | Information | Issuing fetch ad attr call with ./slotdata.js?client=ca-pub1 |
| 78 | Information | Attributes received for slots |
| 78 | Information | Using Multiple Call, Asynchronous Implementation |
| 78 | Warning | No slots defined on page |
| 78 | Error | This slot has not been defined: TOPSLOT |

FIG. 5

Google Debug Window ( Submit Data )

| Offset (msec) | Level | Message |
|---|---|---|
| 0 | Information | google_ads.js is being loaded at Monday, July 31, 2006 1:58:51 PM |
| 0 | Information | publisher URL=http://www.corp.google.com/~stsun/ads2/slot_error.html?google_debug |
| 0 | Information | user agent=Mozilla/5.0 (Windows; U; Windows NT 5.1; en-US; rv:1.8.0.5) Gecko/20060719 Firefox/1.5.0.5 |
| 0 | Information | google_ads.js finished loading |
| 0 | Error | publisher_id cannot be null or empty |
| 0 | Error | publisher_id cannot be null or empty |
| 0 | Error | slot name cannot be null or empty for publisher ca-pub1 |
| 0 | Error | slot name cannot be null or empty for publisher ca-pub1 |
| 15 | Information | Slot: publisher id=ca-pub1, name=TOPSLOT has been added |
| 15 | Error | Slot TOPSLOT has already been defined |
| 15 | Information | [AdData[GA_GoogleAdSlot: pubid=ca-pub1, name=TOPSLOT, loaded=0, tries=0]] |
| 15 | Information | Issuing fetch ad attr call with ./slotdata.js?client=ca-pub1 |
| 62 | Information | Attributes received for slots [TOPSLOT: width=336, height=280, expandable=false, enabled=true] |
| 62 | Information | Using Multiple Call. Asynchronous Implementation |
| 62 | Information | [AdData:[GA_GoogleAdSlot: pubid=ca-pub1, name=TOPSLOT, loaded=0, tries=0]] |
| 78 | Information | FetchAd generated a correlator=1154379531347 |
| 78 | Information | Generated iframe for slot TOPSLOT with <div id=google_ads_div_TOPSLOT><iframe id=google_ads_iframe_TOPSLOT width="336" height="280" vspace="0" hspace="0" src="./data.js?&client=ca-pub1&slotname=TOPSLOT&ref=http%3A%2F%2Fwww.corp.google.com%2F~stsun%2Fads2%2F&url=http%3A%2F%2Fwww.corp.google.co |

FIG. 6

DIAGNOSTICS AND ERROR REPORTING FOR COMMON TAGGING ISSUES

FIELD

This disclosure relates to content requests over a network.

BACKGROUND

Content displayed on web pages can be generated by one or more content servers in response to content requests. Publishers can embed content-server specific tags in web pages in order to serve content (e.g., ads) to their visitors from the content servers. Tags are used to describe what content slots exist in a given web page and what creatives can be served to each slot. Content may not appear in a given web page at the time for rendering due to network latencies, typographical errors in the tag names, and mis-configurations. For example, the tags may be incorrectly or incompletely specified, or correctly specified tags may not match the server-side settings. In addition, content presentation may fail due to client browser or operating system problems, locale or language issues, transient networking issues and the like.

When errors occur, a publisher typically will make a service call, which are time consuming and expensive to the content server provider. In many instances, the content server provider may have difficulty reproducing the underlying problem that causes an error. For example, the cause of the problem may be an older browser or non-supported version of an operating system. Transient network problems are also difficult to reproduce, which makes it difficult for the content server provider to diagnose the problem.

SUMMARY

Disclosed herein are systems and methods relating to the debugging of content requests. According to some implementations, a document at a location is requested that contains a script, where, the request includes an indicator. The requested document is received and the script is executed to test the status of a condition. The status is displayed in a window. The status can be indicated by color-coding in the window.

According to some implementations a system includes a content server configurable to receive content, a publisher server operatively coupled to the content server and configurable to determine a context from the content, and a content repository operatively coupled to the content server and configurable for providing the content server with content associated with a context. The publisher server provides computer executable instructions to a client device upon receiving a request from the client device. The computer executable instructions are executed by the client device to determine conditions related to the communication of content from the content repository to the client device.

According to some implementations a system includes a processor configurable to request content from a remote location and an interface operatively coupled to the processor and configurable to display debugging information. The content includes computer executable instructions to determine the debugging information associated with the request, and the debugging information can includes errors associated with the display of the content in the interface.

These and other example implementations can include one or more of the following features or advantages. In some implementations, the debugging information is provided in a user interface that allows the publisher to diagnose a problem and provide an effective report to the content server provider.

BRIEF DESCRIPTION OF THE DRAWINGS

FIGS. 4-6 are example interfaces for displaying debugging errors.

DETAILED DESCRIPTION

Figure 1:
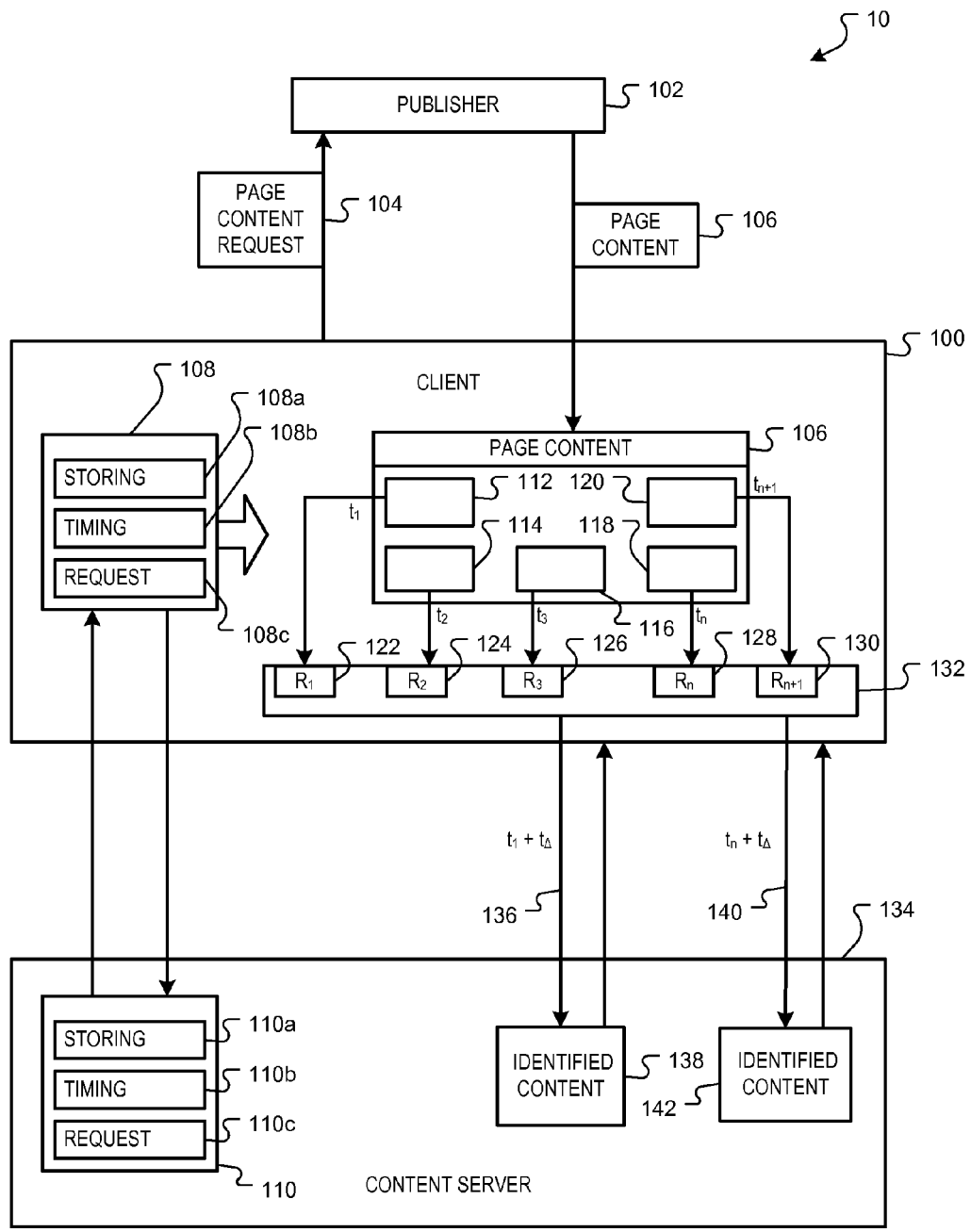
FIG. 1 is a block diagram of a system for requesting content from a content server.

FIG. 1 is a block diagram of a system 10 for requesting content from a content server. In one implementation, the content may include advertisements ("ads"), and the content server can be an ad server. Different types of content can also be requested, e.g., weather, driving directions, trivia, etc.

In one implementation, a client system 100 is configured to visit web pages over a network, e.g., the Internet. The client system 100 can, for example, be a web browser, or a computing device executing network navigation software, etc. The web address (e.g., Uniform Resource Locator (URL)) visited by the client system 100 can be resolved to identify a publisher 102, e.g. a server, hosting the corresponding web page. The client system 100 thus sends a web page content request 104 to the publisher 102 for the web page content 106. The publisher 102, in response to the request, provides the web page content 106 to the client system 100 as, e.g., an HTML document containing JavaScript. The web page content 106 can include one or more content presentations. In an implementation, the content presentations can include advertisement slots for advertisements to be served by an ad server. Other content presentations can also be used.

The web page content 106 provided by the publisher 102 includes a reference to a set of instructions 108. In an implementation, the instructions 108 include storing instructions 108a, timing instructions 108b and request instructions 108c that are used to render and present the requested content, e.g., advertisements. In an implementation, the instructions 108 are provided by a content server 134, e.g., and ad server, and are stored at the client system 100, such as in a cache associated with a web browser. In an implementation, the client system 100 can determine for each subsequent access to the stored instructions 108 whether the stored instructions 108 are the most recent version. If the stored instructions 108 are not the most recent version, the client system 100 can request the most recent version of instructions 110, which can include storing instructions 110a, timing instructions 110b and request instructions 110c from the content server 134. Upon receiving the most recent version of the instructions 110, the client system 100 stores the most recent version of the instructions 110 as the stored instructions 108.

The web page content 106 can define content slots 112-120 that are configured to display content from the content server 134. Though reference is made to a single content server 134, plural content servers can provide content to a single web page. In an implementation, the content slots 112-120 are ad slots that are defined within HTML tags. The instructions 108 generate content requests 122-130 that are issued to request content to fill the content slots 112 to 120. In an implementation, the requests 122 to 130 are stored in a data store 132, such as a buffer 132, and then sent to the content server 134 in one or more requests 136 and 140. The content server 134 processes the received individual or combined request 136 and returns identified content 138 to the client system 100. The identified content 138 is then displayed as part of the publisher's web page in the corresponding content slots, e.g., content slots 112, 114 and 116.

When the client 100 requests content from the publisher 102, errors may be encountered because of mistakes in the tagging of the pages or in other environmental and operational conditions. Such errors include syntax errors, semantic errors, operational errors and environmental errors. Syntax errors are encountered when a web page violates rules for associated with a given protocol, e.g., HTML syntax or JavaScript syntax. Many HTML editors will detect syntax errors. Some common syntax errors include mismatched HTML tags, for example a closing tag is missing, which would prevent the page content from displaying correctly. Incorrect JavaScript syntax, such as a missing quote in a JavaScript function call, is another example.

Semantic errors can also be protocol based. For example, semantic errors can occur when JavaScript function calls are missing or occur in the incorrect sequence. Semantic errors can arise when a invalid or incorrect parameter value name is specified in a protocol (e.g., JavaScript) function calls. Examples include, an incorrect slot name, out-of-sequence JavaScript tags, and a page that attempts to fill a slot that has not been added.

Operational errors occur when content is not displayed as expected because of a discrepancy between tags in the web page content 106 and the information stored on the content server 134. Common operational errors include latency issues within the content server 134 where changed values have not fully propagated through the content server 134, disabled slots in the web page content 106, and particular content not appearing due to frequency capping, day-parting, date or budget issues.

Environmental errors occur when web page content 106 is successfully retrieved, but the client system 100 (e.g., web browser) fails to display the web content 106. For example, the client system 100 may not have JavaScript enabled or the client system 100 may not be supported.

The above errors are provided for exemplary purposes, as many types of errors can occur during the processes of defining, requesting, serving and displaying of web page content 106.

Figure 2:
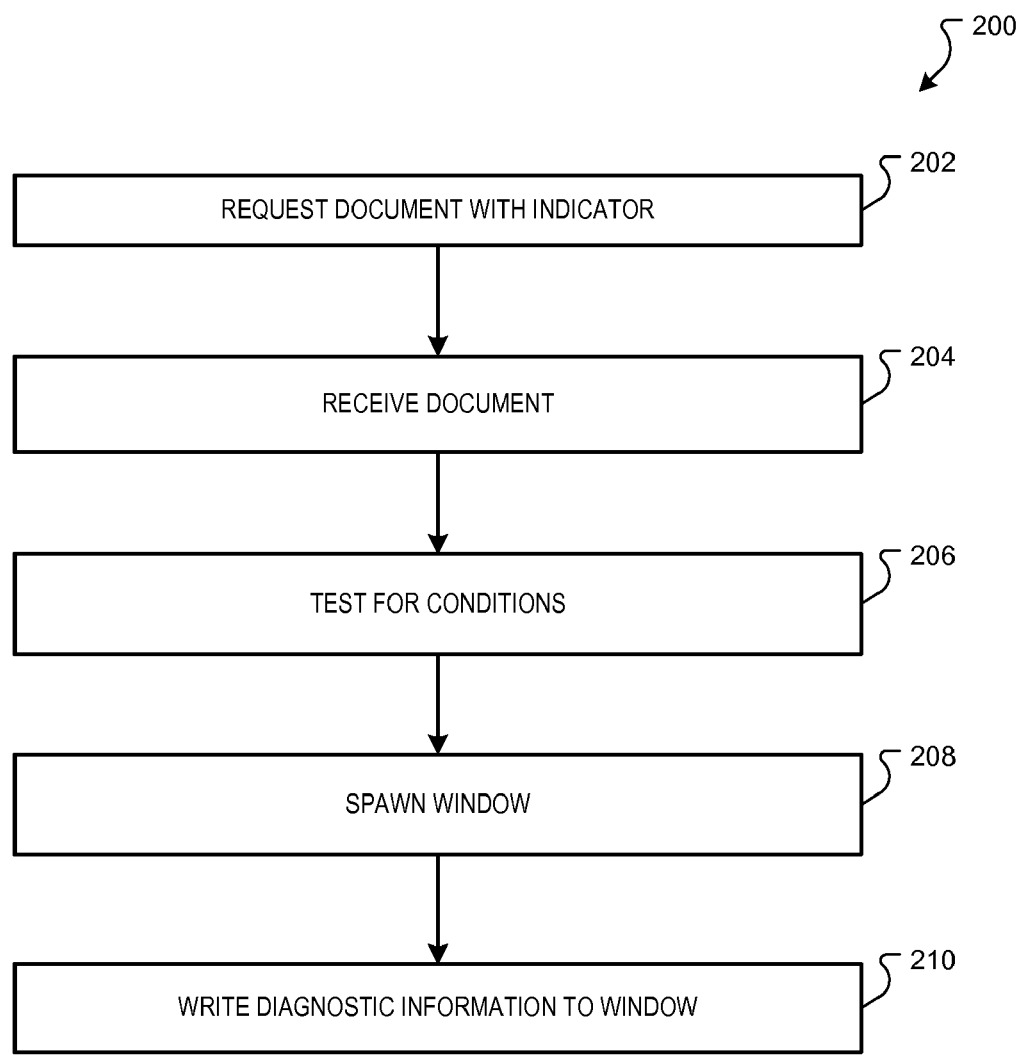
FIG. 2 is an example process for debugging a request for content from the content server.

With reference to FIG. 2, should one of the above exemplary errors occur, in accordance with some implementations, an example process 200 to provide debugging information begins with a request for a document or content from a web site where errors are encountered is made by including a flag (or other indicator) with the request (step 202). For example, a flag "google . . . debug" can be added to the URL of a web page content location as follows: http://www.website-with-errors.com/index.htm?google . . . debug.

Next, the requested document is received (step 204), and various conditions are tested to diagnose the cause of the errors (step 206). In some implementations, the content serving (e.g., JavaScript) tags within the web page content 106 implement diagnostic logic. For example, a script file within the web page content 106 can test for various conditions, and upon the existence or absence of such conditions, write information to a debugging user interface. The scrip file diagnostic logic tests to determine error related to, but not limited to: an identifier of the publisher 102, an order in which the web page content is served, if a slot is defined or disabled, if a slot was previously defined, attributes of slots, if a requested URL is too long, if an iFrame should be created for a slot (i.e., a frame inserted within a Web page which is not bound to the side of a browser window), if an HTML DIV element should be created for a slot, and if content for a slot has been received.

In some implementations, the content serving (e.g., JavaScript) tags within the web page content 106 implement tracing logic. Such tracing logic can capture server-bound URLs and responses from the content server 134 which are displayed in the debugging user interface. Displaying missing parameters in the URL or escaping issues in the responses aids in debugging errors. In some implementations, other information such as the UserAgent is captured and displayed.

In some implementations, a timer is started as each URL or request is communicated the content server 134 or publisher 102, which times-out when a response is received by the client 100. The timing information can be used to determine where environmental and operational delays are encountered.

After the conditions are tested, a debugging user interface is spawned (step 208) and information regarding the results of the testing are written to the debugging user interface (step 210). In some implementations, the debugging user interface is created by JavaScript code that provides a separate browser window. A JavaScript class provides methods such as writeInfo, writeWarning, writeError to write various types of information to the debugging window. The methods also display timing information to show the length of time consumed by a particular operation, and color-code errors and unusual circumstances to identify problems.

Figure 3:
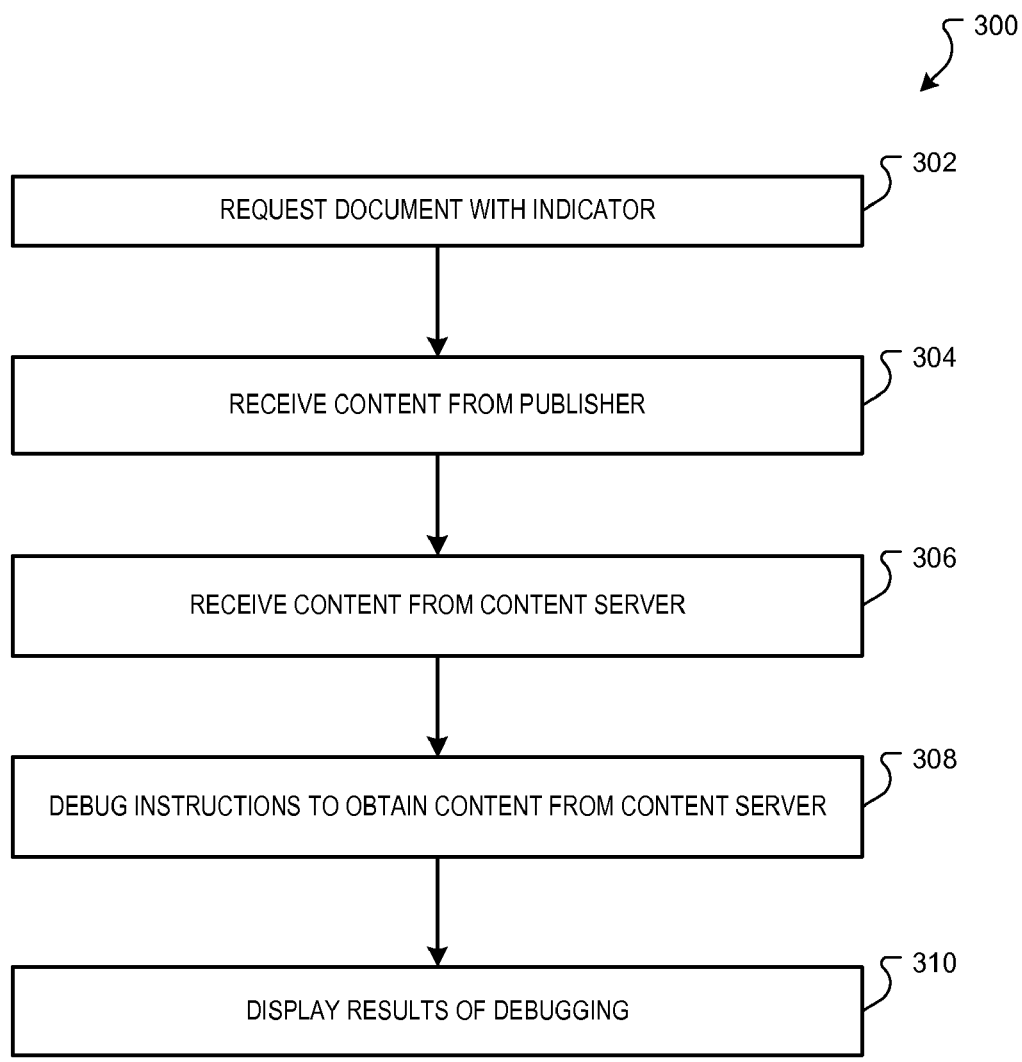
FIG. 3 is another example process for debugging a request for content from the content server.

FIG. 3 is a flow chart of another exemplary process 300 to debug errors in retrieving content from the content server 134. A document or content 106 from the publisher 102 is requested, where the request include an indicator (step 302). The document or content 106 is received by the client 100 (step 304). Content from the content server is then received (step 306). In some implementations, the content 106 received from the publisher 102 includes a script having instructions that requests content from the content server 134 and provides that content to the client 100.

Next, the instructions to obtain content from the content server are debugged (step 308). In some implementations, the content serving (e.g., JavaScript) tags within the web page content 106 implement diagnostic and/or tracing logic, as described above with regard to FIG. 2. The results of the debugging are displayed (step 310). In some implementations, the debugging user interface is created by JavaScript code that provides a separate browser window, within which information is written, as noted above.

Below is an example portion of HTML code that requests content (e.g., ads) from the content server 134 and displays the web page content 106. In the example below, one slot is requested form the content server 134, and additional slots can be requested.

```
<html xmlns="http://www.w3.org/1999/xhtml" lang="en" xml:lang="en">
<head>
    <!-- download Google Ads JavaScript -->
    <script language="JavaScript" src="./google_service.js">
    </script>
    <script language="JavaScript">
        GS_googleAddAdSenseService("ca-pub1");
        GS_googleEnableAllServices( );
    </script>
    <!-- JavaScript for slot TOPSLOT -->
    <script language="JavaScript">
        GA_googleAddSlot("ca-pub1", "TOPSLOT");
    </script>
    <!-- JavaScript for retrieving ads -->
    <script language="JavaScript">
        GA_googleFetchAds( );
    </script>
</head>
<body onload="">
```

-continued

```
<!-- create iframe for TOPSLOT -->
<script language="JavaScript">
    GA_googleFillSlot("TOP2SLOT");
</script>
<div id="content">
<p> Sample page content.
</p>
</div>
</body>
</html>
```

In the example, a script file (google . . . service.js) is designated in the header for serving content (e.g., slots 112-120) that is displayed as part of the web page content 106. The publisher has added a particular slot "TOPSLOT;" however, the publisher has indicated that a slot "TOP2SLOT" is to be filled. The slot TOPL2SLOT does not exist either because it is misspelled or missing. When the client system 100 executes the script, the diagnostic logic generates warnings using the writeError ( ) method or errors using the writeError ( ) method based on this mismatch. An example of this is shown in FIG. 4, where the debugging user interface 400 created by the diagnostic logic indicates that the slot has not been defined.

FIG. 5 illustrates another example debugging user interface 500 where the publisher has not defined any slots and the script generates a warning. When the publisher attempts to render TOPSLOT, an error message is generated in the debugging user interface 500.

FIG. 6 illustrates a debugging user interface 600, showing other errors such as a missing publisher identifier, TOPSLOT has been defined, a missing slot name, duplicate definitions of TOPSLOT, and other transactional information.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications, and variations to the examples without departing from the scope of the invention.

What is claimed is:

1. A computer-implemented method, comprising: requesting, at a client device, a document referencing a script stored at a location, the script including content processing instructions and diagnostic instructions; receiving, at the client device, the document and the script in response to the request; executing, at the client device, the content processing instructions of the script to process content requests for requesting content to be displayed with the document; executing, at the client device, the diagnostic instructions of the script to determine whether the request included an additional debug indicator and only in response to determining that the request included the additional debug indicator: performing, at the client device, diagnostic tests related to the processing of the content requests for the document; generating, at the client device, a debugging user interface; and displaying in the debugging user interface results of the diagnostic tests.

2. The method of claim 1, wherein:
the document is a web page; and
further comprising displaying the web page in a first browser window on the client device;
wherein generating, at the client device, a debugging user interface comprises generating a second browser window separate from the first browser window on the client device.

3. The method of claim 2, further comprising:
determining a status state of a result of a diagnostic test; and
color-coding the result based the status state.

4. The method of claim 2, further comprising:
displaying timing information in the second browser window to show a length of time required complete an operation tested by a diagnostic test.

5. The method of claim 2, further comprising:
displaying requests made to a content server in the second browser window; and
display responses from the content server in the second browser window.

6. The method of claim 1, wherein performing diagnostic tests related to the processing of the content requests comprises testing if function calls specified in the document are missing or occur in an incorrect sequence.

7. The method of claim 1, wherein performing diagnostic tests related to the processing of the content requests comprises determining if the document includes an incorrect slot name, or out-of-sequence JavaScript tags.

8. The method of claim 1, wherein performing diagnostic tests related to the processing of the content requests comprises determining if a discrepancy exists between information specified by the document and information stored on a content server.

9. The method of claim 8, wherein the discrepancy comprises one of differences between tags specified in the document and information on the content server, latency issues caused by delays in the content server, or disabled slots in the document.

10. The method of claim 1, wherein performing diagnostic tests related to the processing of the content requests comprises testing if requested content is successfully received by the client device but not displayed.

11. The method of claim 1, wherein the request is a Uniform Resource Locator (URL) of the document and the indicator is a flag added to the URL.

12. A system, comprising:
a content server configured to receive content requests from a client device and provide content in response to the content requests, and further configured to receive script requests from the client device and provide a script in response to the request;
wherein the content requests and the script requests are sent from the client device in response to rendering a web page provided to the client device from a publisher server in response to a page request from the client device, the web page including instructions that cause the client device to send the content requests and script requests; and
a repository operatively coupled to the content server and storing the content and the script;
wherein the script includes diagnostic instructions that are executed by the client device and cause the client device to determine if the web page request for the web page included an additional debug indicator, and only in response to determining that the web page request included the additional debug indicator, perform the operations of:
performing, at the client device, diagnostic tests related to the processing of the content requests for the web page;

generating, at the client device, a debugging user interface; and displaying in the debugging user interface results of the diagnostic tests.

13. A computer-readable medium having instructions stored thereon, which, when executed by a client device, causes the client device to perform the operations of:

processing first content requests for requesting first content to be displayed with a web page provided by a publisher, the web page having been received at the client device in response to a web page request;

determine whether the web page request included an additional debug indicator and only in response to determining that the web page request included the additional debug indicator:

performing diagnostic tests related to the processing of the content requests for the web page;

generating a debugging user interface; and displaying in the debugging user interface results of the diagnostic tests.

14. The computer-readable medium of claim 13, where displaying results of the diagnostic tests comprises:

determining a severity of the results; and color-coding the results based the severity.

15. The computer-readable medium of claim 13, where displaying results of the diagnostic tests comprises displaying timing information in the debugging user interface to show a length of time required complete a predetermined instruction.

16. The computer-readable medium of claim 13, wherein performing diagnostic tests related to the processing of the first content requests comprises testing if function calls are missing or occur in the wrong sequence.

17. The computer-readable medium of claim 13, wherein performing diagnostic tests related to the processing of the first content requests comprises testing for an incorrect slot name, or out-of-sequence JavaScript tags.

18. The computer-readable medium of claim 13, wherein performing diagnostic tests related to the processing of the first content requests comprises testing to determine if discrepancies exist between the instructions and information stored on the content server.

19. The computer-readable medium of claim 18, wherein the discrepancies include differences between tags specified in the instructions and information on the content server, latency issues caused by delays in the content server, or disabled slots in the web page.

20. The computer-readable medium of claim 13, wherein performing diagnostic tests related to the processing of the first content requests comprises further comprises testing if content is successfully received but not displayed.

21. The system of claim 12, wherein:

the web page is rendered in a first window at the client device; and generating, at the client device, a debugging user interface comprises generating a second browser window separate from the first browser window on the client device.

22. The system of claim 12, wherein performing diagnostic tests related to the processing of the first content requests comprises:

testing for syntax errors in the web page; and testing for semantic errors in the web page.

23. The system of claim 12, wherein displaying in the debugging user interface results of the diagnostic tests comprises:

displaying a status level of a result of each diagnostic test;

displaying a message detailing the result of each diagnostic test; and color-coding each message according to the status of the result.

* * * * *

UNITED STATES PATENT AND TRADEMARK OFFICE
CERTIFICATE OF CORRECTION

PATENT NO.        : 7,644,315 B2                                    Page 1 of 1
APPLICATION NO. : 11/554397
DATED             : January 5, 2010
INVENTOR(S)       : Stephen Tsun It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 389 days.

Signed and Sealed this

Sixteenth Day of November, 2010

David J. Kappos
*Director of the United States Patent and Trademark Office*